US008230124B2

(12) United States Patent
de Cesare et al.

(10) Patent No.: US 8,230,124 B2
(45) Date of Patent: Jul. 24, 2012

(54) METHODS AND SYSTEMS TO DYNAMICALLY MANAGE PERFORMANCE STATES IN A DATA PROCESSING SYSTEM

(75) Inventors: Joshua de Cesare, Campbell, CA (US); Keith Cox, Campbell, CA (US); Kenneth C. Dyke, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/189,379

(22) Filed: Jul. 22, 2011

(65) Prior Publication Data
US 2011/0283023 A1  Nov. 17, 2011

Related U.S. Application Data

(62) Division of application No. 12/772,691, filed on May 3, 2010, now Pat. No. 7,996,578, which is a division of application No. 11/849,017, filed on Aug. 31, 2007, now Pat. No. 7,711,864.

(51) Int. Cl.
*G06F 3/00* (2006.01)
(52) U.S. Cl. .............................................. 710/8; 710/14
(58) Field of Classification Search .................. 710/8, 14
See application file for complete search history.

(56) References Cited

U.S. PATENT DOCUMENTS

| 5,768,599 A | 6/1998 | Yokomizo |
| 6,002,436 A | 12/1999 | Anderson |
| 6,016,548 A | 1/2000 | Nakamura et al. |
| 6,115,776 A | 9/2000 | Reid et al. |
| 6,360,327 B1 | 3/2002 | Hobson |
| 6,434,708 B1 | 8/2002 | Dunnihoo et al. |
| 6,442,700 B1 | 8/2002 | Cooper |
| 6,473,607 B1 | 10/2002 | Shohara et al. |
| 6,477,654 B1 | 11/2002 | Dean et al. |
| 6,574,740 B1 | 6/2003 | Odaohhara et al. |
| 6,625,740 B1 | 9/2003 | Datar et al. |
| 6,633,942 B1 | 10/2003 | Balasubramanian |
| 6,795,781 B2 | 9/2004 | Aldridge et al. |
| 6,816,750 B1 | 11/2004 | Klaas |
| 7,005,871 B1 | 2/2006 | Davies et al. |
| 7,039,819 B1 | 5/2006 | Kommrusch et al. |
| 7,124,225 B2 | 10/2006 | Yao |

(Continued)

FOREIGN PATENT DOCUMENTS

EP   1 164460 A1   12/2001

(Continued)

OTHER PUBLICATIONS

ARM Limited, "ARM Architecture Reference Manual", 2005, pp. I through A2-70, Cambridge, England.

*Primary Examiner* — Chun-Kuan Lee
*Assistant Examiner* — David Martinez
(74) *Attorney, Agent, or Firm* — Blakely, Sokoloff, Taylor & Zafman LLP

(57) ABSTRACT

Data processing systems which operate in different modes, including a mode which supports providing an output of images through a port on the systems. In one embodiment, a data processing system includes a processing system, a cellular telephone transceiver, and a port which is configured to provide, as an output from the handheld data processing system, data representing movie video images. Methods and machine readable media are also described.

10 Claims, 11 Drawing Sheets

U.S. PATENT DOCUMENTS

| | | |
|---|---|---|
| 7,165,134 B1 | 1/2007 | Kardach |
| 7,254,721 B1 | 8/2007 | Tobias et al. |
| 7,373,362 B2 * | 5/2008 | Detweiler et al. ............ 1/1 |
| 7,382,366 B1 | 6/2008 | Klock et al. |
| 7,529,958 B2 | 5/2009 | Roth et al. |
| 7,539,880 B2 | 5/2009 | Mentzer et al. |
| 7,562,234 B2 | 7/2009 | Conroy et al. |
| 7,825,717 B2 * | 11/2010 | Kim ........................... 327/415 |
| 2002/0112193 A1 | 8/2002 | Altman et al. |
| 2002/0135398 A1 | 9/2002 | Choi et al. |
| 2002/0190920 A1 * | 12/2002 | Kung ............................. 345/3.1 |
| 2003/0095096 A1 | 5/2003 | Robbin et al. |
| 2003/0119553 A1 * | 6/2003 | Chuang ......................... 455/557 |
| 2003/0126487 A1 | 7/2003 | Soerensen et al. |
| 2003/0196129 A1 | 10/2003 | Lin |
| 2004/0050123 A1 * | 3/2004 | Macherides et al. ........ 70/456 R |
| 2004/0148533 A1 | 7/2004 | Nicholas |
| 2004/0199695 A1 | 10/2004 | Purdham et al. |
| 2004/0224638 A1 | 11/2004 | Fadell et al. |
| 2005/0062502 A1 | 3/2005 | Arakawa |
| 2005/0149769 A1 | 7/2005 | O'Connor et al. |
| 2005/0240786 A1 | 10/2005 | Ranganathan |
| 2006/0031692 A1 | 2/2006 | Kato et al. |
| 2006/0075267 A1 | 4/2006 | Tokue |
| 2006/0114987 A1 * | 6/2006 | Roman .................... 375/240.01 |
| 2006/0156043 A1 | 7/2006 | Liu et al. |
| 2007/0005995 A1 | 1/2007 | Kardach et al. |
| 2007/0043963 A1 | 2/2007 | Cheng et al. |
| 2007/0150929 A1 | 6/2007 | Kizaki |
| 2008/0016380 A1 | 1/2008 | Stufflebeam |
| 2008/0103977 A1 * | 5/2008 | Khosravy et al. ............... 705/59 |
| 2008/0147946 A1 | 6/2008 | Pesavento et al. |
| 2008/0168285 A1 | 7/2008 | de Cesare |
| 2011/0117864 A1 * | 5/2011 | Lazaridis ..................... 455/90.1 |

FOREIGN PATENT DOCUMENTS

| | | |
|---|---|---|
| EP | 1 282 030 A1 | 2/2003 |
| EP | 1 503 271 A2 | 2/2005 |
| EP | 1 645 940 A2 | 4/2006 |
| EP | 1 739 523 A2 | 1/2007 |
| JP | 2001 188628 A | 7/2001 |

* cited by examiner

| | 401 | 402 | 403 | 404 |
|---|---|---|---|---|
| COMPONENT 1 (E.G., CPU) | 100% | 0 | 0% |
| COMPONENT 2 (E.G., CPU) | 100% | 1 | 100% |
| COMPONENT 3 (E.G., H264) | 100% | 0 | 0% |
| COMPONENT 4 (E.G., LCD) | 50% | 1 | 50% |
| COMPONENT 5 (E.G., AMC) | 25% | 0 | 0% |

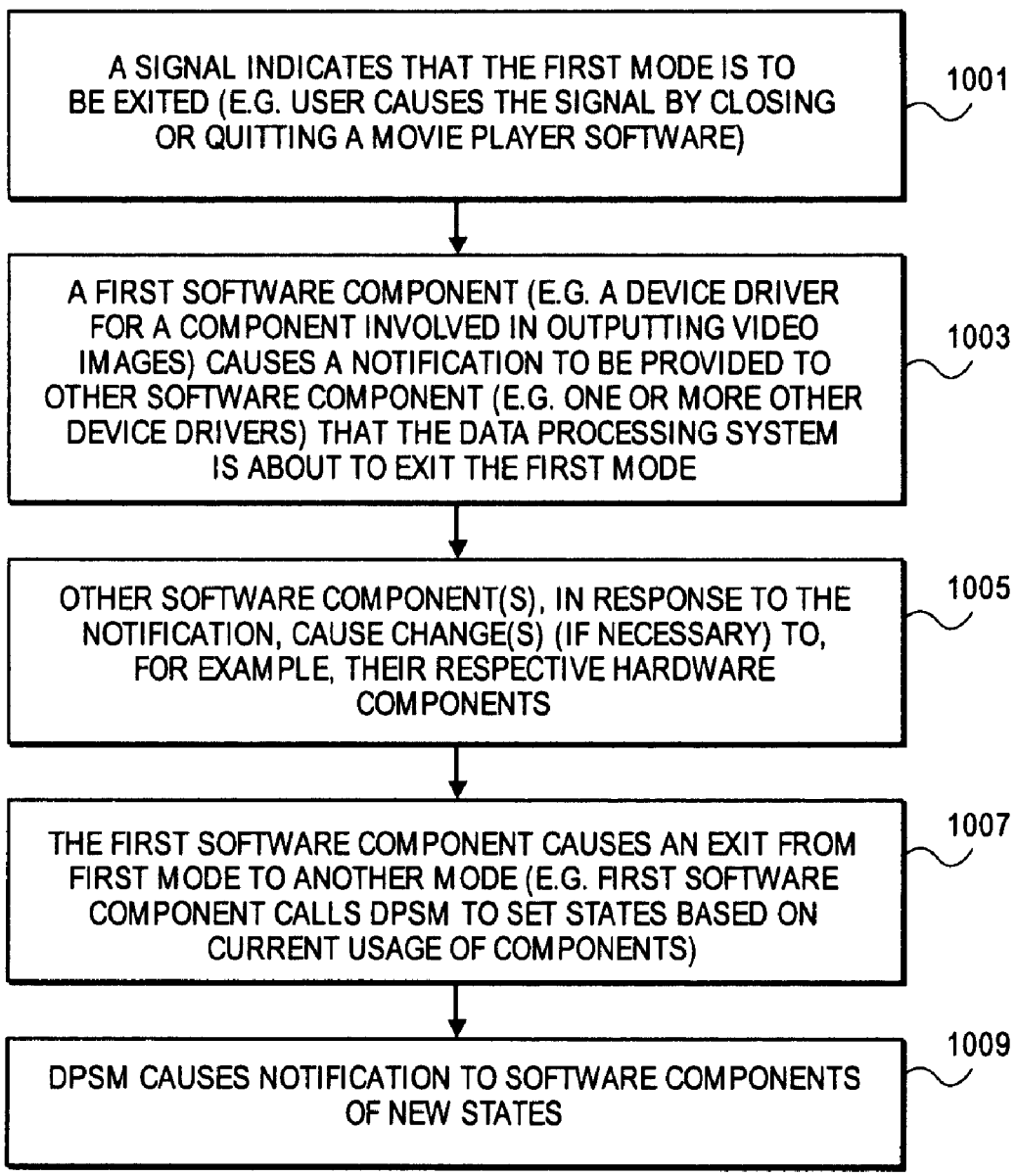

METHODS AND SYSTEMS TO DYNAMICALLY MANAGE PERFORMANCE STATES IN A DATA PROCESSING SYSTEM

This application is a divisional of co-pending U.S. patent application Ser. No. 12/772,691, filed on May 3, 2010 which is a divisional of U.S. patent application Ser. No. 11/849,017, filed on Aug. 31, 2007, which issued as U.S. Pat. No. 7,711,864 on May 4, 2010.

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright® 2007, Apple Inc., All Rights Reserved.

FIELD OF THE INVENTION

Embodiments of the invention relate to data processing systems, and more particularly, to managing performance states of the data processing systems.

BACKGROUND

Power management on a data processing system often involves techniques for reducing the consumption of power by components in the data processing system. The data processing system may be a laptop or otherwise portable computer, such as a handheld general purpose computer or a cellular telephone. The management of power consumption in a portable device which is powered by a battery is particularly important because better power management usually results in the ability to use the portable device for a longer period of time when it is powered by one or more batteries.

Conventional systems typically utilize timers to indicate when a subsystem should be turned off after a period of inactivity. For example, the motors in a hard drive storage system are typically turned off after a predetermined period of inactivity of the hard drive system. Similarly, the backlight or other light source of a display system may be turned off in response to user inactivity which exceeds a predetermined period of time. In both cases, the power management technique is based on the use of a timer which determines when the period of inactivity exceeds a selected duration.

In other power managing techniques, the data processing system may be switched between different operating points. An operating point may represent a particular operating voltage and frequency pair. For example, one operating point consumes less power by having the data processing system operate at a lower voltage and also at a lower operating frequency relative to another operating point. In the case of another operating point, the data processing system operates at a higher voltage and a higher operating frequency.

Certain systems provide the capability to switch power completely off (e.g. set the operating voltage at V=0) if no use is being made of a particular subsystem. For example, certain systems on a chip (SOCs) provide a power saving feature which allows for particular subsystems to be turned off completely if they are not being used.

Existing power management techniques typically manage the power based on the theoretical assumptions. The existing power management techniques typically do not take into account the actual states of the system components. Such techniques lack accuracy, reliability, and are unable to efficiently manage the power of the digital processing system.

Some existing power management techniques may manage power of a component using the local information. These techniques typically have control of power only over a single component and do not have control of power over the other components in the system. In such techniques, for example, the power of a central processing unit ("CPU") may be controlled based on the local load of this CPU, while the power of other components of the system, e.g., a graphics processor, remains uncontrolled.

Other existing power management techniques may manage total power supplied to the system based on the total load of the system.

SUMMARY OF THE DESCRIPTION

In an embodiment described herein, a handheld data processing system includes a processing system and a port which is coupled to the processing system and a cellular telephone transceiver coupled to the processing system. The port and the processing system are configured to provide, as an output from the handheld data processing system, data representing movie video images in at least one mode of operating the handheld data processing system. The handheld data processing system may include a battery coupled to the processing system, and the port may be coupled to the battery and may be configured to allow recharging of the battery when the system is coupled to a power source. The handheld data processing system may also include a display coupled to the processing system and integrated into a housing of the handheld data processing system and may also include an input device coupled to the processing system; further, the movie video images may be provided in a sequence of images of at least 15 frames per second to an external display through the port. The handheld data processing system may, in certain embodiments, occupy a volume of less than about 6 inches by 4 inches by 1 inch. In one embodiment, the data representing movie video images are transmitted through the port to allow playback on the external display in response to determining that a system controlling the external display is configured to not copy, in a permanent storage, the content of the movie video images; in another embodiment, the data representing the movie video images are transmitted through the port to allow playback on the external display in response to determining that the system controlling the external display is authorized, under a digital rights management system, to retain a copy of the data representing movie video images.

In another embodiment described herein, a data processing system includes an input/output (I/O) port configured to provide data representing video images (such as still pictures or a movie) to a display device in a first mode and a processing system coupled to the I/O port. In the first mode, the data processing system operates a first component at a first frequency, and the processing system is configured to execute at least a first device driver which is configured to control the first component and is configured to execute a second device driver which is configured to control a second component that provides the data representing the video images. The second device driver may cause a first notification to be provided to the first device driver when the data processing system transitions to the first mode from another mode such as a second mode. The I/O port may be configured to provide a communications channel for synchronizing data between the data processing system and a host system, and the synchronizing may be capable of being performed in the second mode in which the data processing system operates the first component at a second frequency which is less than the first frequency. The second device driver may be configured to cause a change from a set of the second frequency and a second voltage to a set of the first frequency and a first voltage and vice versa. In one embodiment, the I/O port may be used to connect the system to a dock which is connected to a host system, and the I/O port may be configured to recharge the battery in the data processing system while in the first mode, and the images may be provided in a sequence as a motion picture or movie at a rate of at least 15 frames per second and as high as 30 or 60 frames per second. In one embodiment, at least one component in the data processing system is operated at a frequency higher than its specified normal operating frequency range or is operated at a voltage which is higher than a normal voltage. In one embodiment, different components in the data processing system are operated at different operating frequencies in the first mode as specified by a first set of frequencies and the different components are operated at different operating frequencies in the second mode as specified by a second set of frequencies. In one embodiment, the data representing video images are transmitted through the I/O port to allow playback on an external display in response to determining that a system controlling the external display is configured to not copy, in a permanent storage, the content of the video images; in another embodiment, the data representing video images are transmitted through the I/O port to allow playback on the external display in response to determining that a system controlling the external display is authorized, under a digital rights management system, to retain a copy of the data representing video images. In one embodiment, the data processing system includes a storage device which is configured to store music, movies, calendar information, contact information and emails, and the data processing system is configured with software to allow a user to view and manipulate the music, movies, calendar information, contact information and emails.

In another embodiment described herein, a method of operating a data processing system includes operating the data processing system in a first mode with a plurality of components in the system operating at different frequencies as specified by a first set of frequencies, wherein a minimum operating state of a most performance-needy component in the first mode determines the frequencies in the first set, and receiving a signal indicating a transition to a second mode and transitioning from the first mode to the second mode in which the plurality of components operate at different frequencies as specified by a second set of frequencies, wherein one of the components in the second mode provides an output of data representing video images through an output port of the system. The video images may be a sequence of video images, such as a still image or a motion picture or movie (with or without sound), which are transmitted through the port at a predetermined rate such as 10 or 15 or 30 or 60 frames per second. The method may further include providing at least one notification of the transitioning to a first software device driver of at least one of the components, and the at least one notification may occur before the transitioning. In one embodiment, the data representing video images are transmitted through the output port to allow playback on an external display in response to determining that a system (e.g. a host system) controlling the external display is configured to not copy, in a permanent storage, the content of the video images; in another embodiment, the data representing the video images are transmitted through the port to allow playback on an external display in response to determining that a system controlling the external display is authorized, under a digital rights management system, to retain a copy of the data representing the video images.

In another embodiment described herein, a method of operating a data processing system includes receiving a signal indicating a transition to a first mode from a second mode and providing, in response to the signal, a notification, caused by a first software driver for a first component, to at least a second software driver for a second component to cause the second software driver to configure the second component to operate in the first mode. The first mode is configured to operate at least one component of the data processing system beyond a specified normal operating parameter, and the second mode is configured to operate all of the components of the data processing system within specified normal operating parameters, such as the normal operating parameters specified by a designer and/or manufacturer of a component. In one embodiment, the first mode includes providing a sequence of video images through a port at a predetermined rate to show a motion picture movie (with or without sound) on an external display. In one embodiment, the method includes using a DPSM unit to manage operating states for different components in different modes.

Embodiments of methods and apparatuses to dynamically manage a performance state of a data processing system are described. The data processing system, in certain embodiments, includes a plurality of components. A current system performance state, which may apply to each of the components in certain embodiments, is determined based on a plurality of current states of components of the system and a plurality of required system performance states for the components. The plurality of current states may include on/off states of the components of the system. The plurality of required system performance states for the components may be determined using performance constraints of the components and a set of performance states that the data processing system supports, including a state that supports providing, as an output from the system, video images at a frame rate of at least 15 frames per second.

In one embodiment, a performance level of at least one component is adjusted based on the current system performance state. The current system performance state (e.g., a system bus speed and/or other parameters) may apply to each of the components. Adjusting the performance level of the at least one component may include changing a frequency, a bandwidth, a voltage, or any combination thereof. At least one component driver may be notified about a change in the system performance state before adjusting of the performance level, after adjusting of the performance level, or both. In one embodiment, actual performances for the components are determined based on current states of the components of the system and the required system performance states for the components. In one embodiment, the current system performance state is determined using the actual performances for the components. In one embodiment, the system performance state is determined relative to a maximum system performance state.

In one embodiment, the data processing system includes one or more buses coupled to the plurality of components, and a dynamic performance state manager ("DPSM") unit coupled to the one or more components. The DPSM unit may be configured to receive information about current states of each of components of the system or a portion of the system. The DPSM unit may be configured to determine required system performance states for the components. The DPSM unit may be further configured to determine a current system performance state, which may be a state for multiple components (or even globally for all components), based on the current states of components of the system and the required system performance states for the components. The current system performance state may include a system wide parameter, such as a speed (in MHz, for example) of a system wide bus, set for all (or a portion of) the components in the system; in this embodiment, a global parameter is derived from a global decision which may be based on local information (e.g., local information from each subsystem about the processing state or processing requirements/needs for the subsystem). The dynamic performance state manager unit may be further configured to adjust a performance level of at least one component based on the current system performance state. The data processing system may include one or more device drivers coupled to the one or more buses. In one embodiment, the DPSM unit is configured to notify at least one device driver about a change in the performance state of the system.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 4 shows a data structure that is generated by a performance calculator according to one embodiment of the invention.

FIG. 10 is a flowchart which shows another method of operating a data processing system.

DETAILED DESCRIPTION

Figure 1:
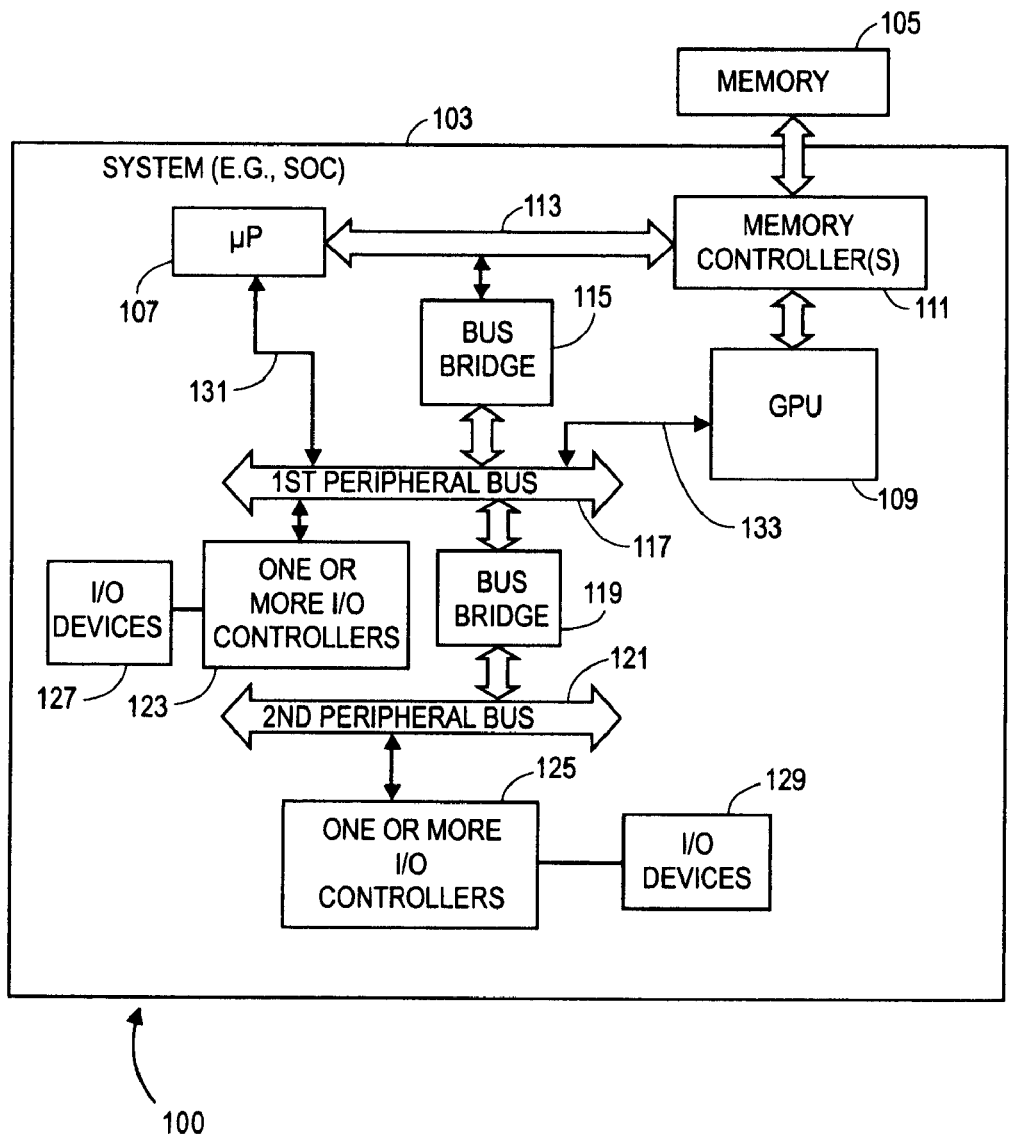
FIG. 1 shows an example of a data processing system that may be used according to one embodiment of the invention.

At least certain embodiments relate to methods and systems which provide an output of images in a mode or state of the systems. These embodiments are described further below.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily refer to the same embodiment.

Unless specifically stated otherwise, it is appreciated that throughout the description, discussions utilizing terms such as "processing" or "computing" or "calculating" or "determining" or "displaying" or the like, refer to the action and processes of a data processing system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk, including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of media.

The algorithms and displays presented herein are not inherently related to any particular computer or other apparatus. Various general-purpose systems may be used with programs in accordance with the teachings herein, or it may prove convenient to construct more specialized apparatus to perform the required machine-implemented method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s).

Embodiments of the inventions described herein may be part of other types of data processing systems, such as, for example, entertainment systems or personal digital assistants (PDAs), or general purpose computer systems, or special purpose computer systems, or an embedded device within another device, or cellular telephones which do not include media players, or devices which combine aspects or functions of these devices (e.g., a media player, such as an iPod®, combined with a PDA, an entertainment system, and a cellular telephone in one portable device), or devices or consumer electronic products which include a multi-touch input device such as a multi-touch handheld device or a cell phone and handheld computer with a multi-touch input device. Examples of handheld devices or cellular telephones with data processing capabilities (e.g. a handheld computer) are described in U.S. application Ser. No. 11/586,862, filed on Oct. 24, 2006, which application is hereby incorporated herein by reference.

FIG. 1 shows an example of a data processing system that may be used in at least one embodiment of the present invention. Data processing system 100 shown in FIG. 1 includes a memory 105 and a system 103 which may be implemented in at least one embodiment as a system on a chip, which is a monolithic semiconductor substrate which forms an integrated circuit that provides all the components for the system on a single chip. In an alternative embodiment, the various components may be spread over multiple integrated circuits. System 103 includes a microprocessor 107 which is coupled to memory 105 through a bus 113 and a memory controller 111. Memory controller 111 may be multiple memory controllers for controlling different types of memory 105, such as dynamic random access memory (DRAM) (e.g. double-data-rate (DDR) RAM), and flash memory and/or other types or combinations of memory such as a magnetic hard drive, etc. Memory controller 111 is coupled to a graphics processing unit (GPU) 109 which allows GPU 109 to obtain graphics data or store graphics data in memory 105 and to retrieve graphics instructions, for processing by the GPU, from memory 105. It will be understood that GPU 109 is coupled to a display controller (not shown), which in turn is coupled to a display (not shown), such as a color liquid crystal display (CLCD), to drive the display to cause images to appear on the display.

Microprocessor 107, memory controller 111, memory 105, and GPU 109 are coupled to other components of system 103 through peripheral buses 117 and 121 and bus bridges 115 and 119, as shown in FIG. 1. Bus bridge 115 couples bus 113 to a peripheral bus 117, and a bus bridge 119 couples peripheral bus 117 to peripheral bus 121. Microprocessor 107 and GPU 109 are coupled to peripheral buses 117 and 121 through these bus bridges. GPU 109 is also coupled to peripheral bus 117 through a control port for graphics 133, and microprocessor 107 is also coupled to peripheral bus 117 through a peripheral port 131 of microprocessor 107. One or more input/output (I/O) devices may be part of system 100. These I/O devices may be one or more of a plurality of known I/O devices including track pads, touch pads, multi-touch input panels, an audio speaker and an audio microphone, a camera, a dock port, one or more wireless interface controllers, a cursor control device such as a mouse or a joystick or a trackball, one or more keyboards, one or more network interface adapters (e.g. an Ethernet interface port), etc. A dock port or other port may be used to couple the system 100 to an external display, either directly or through another system such as a host system; the dock port or other port may provide the ability to recharge a battery in the system 100 and may provide the ability to exchange information (e.g. synchronize contact and calendar information) with another system, such as a host system. The dock port or other port may transmit a sequence of video images, such as a motion picture or movie (with or without sound) through the port to the external display and this transmission may be at a sufficient rate to permit the playback of a movie, such as a rate of at least 15 or 30 or 60 frames per second. The port may provide the data in a compressed format and/or an encrypted format or a format protected by a digital rights management (DRM) system or may provide the data in a format adapted to be directly displayed on a TV such as an NTSC or PAL or similar such formats. If system 103 is implemented as a system on a chip, then the I/O devices 127 and 129 would typically be a separate component which is not disposed on the integrated circuit. Each of the I/O devices 127 and 129 are coupled through I/O controllers, such as the I/O controllers 123 and the I/O controllers 125 as shown in FIG. 1.

In addition to the I/O devices previously listed, system 103 may include other subsystems (not shown) which may be considered an I/O device, such as an audio codec, a video decoder or a digital signal processor, for example, a video decoder and a digital signal processor (DSP). An embodiment of system 100 shown in FIG. 1 may include a power controller (not shown) and a power management unit (not shown) in order to provide power gating to the various components in the system 103, as described in co-pending U.S. patent application Ser. No. 11/620,703, filed Jan. 7, 2007, which is entitled "Methods And Systems For Power Management In A Data Processing System" and which is owned by the assignee of the instant inventions. This application is incorporated herein by reference in its entirety. In one embodiment, the power gating in system 103 can use a clock enable/disable signal for a component to indicate amount of work to be done.

In one embodiment, system 100 uses a single system clock (not shown) to drive microprocessor 107, GPU 109, memory controllers 111, memory 105, buses 113, 117, and 121, and through peripheral buses 117 and 121, I/O controllers 123 and 125, and I/O devices 127 and 129. Frequency of the system clock, and/or system voltage can determine how much power is used by system 100. The frequency of the system clock and/or system voltage can effectively control how much performance can be obtained from each of the components of the system. If the component operates at faster clock frequency, and/or higher voltage, the component may dissipate more power.

Figure 2:
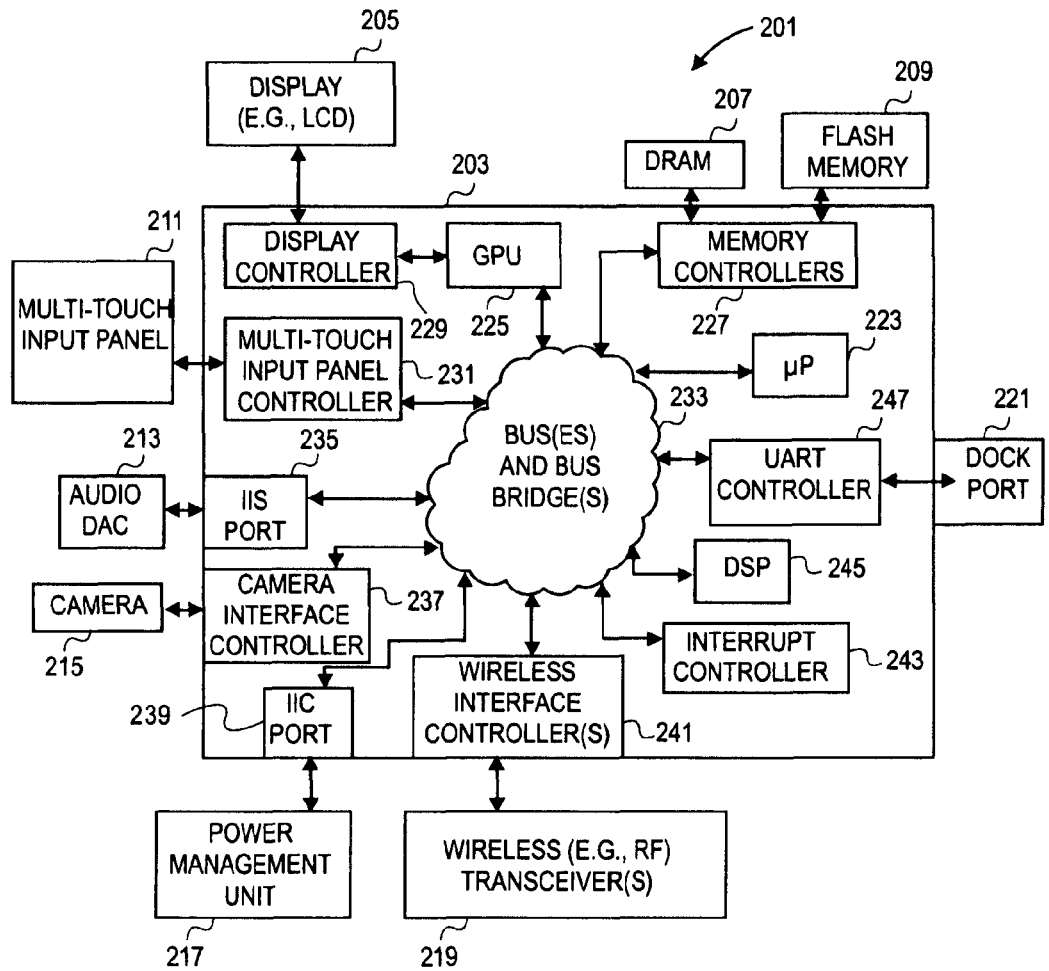
FIG. 2 shows another example of a system which may be used according to another embodiment of the invention.

FIG. 2 shows another example of a system which may be used with one or more of the inventions described herein. A data processing system 201 may implement a system 203 as a system on a chip (SOC) integrated circuit or may implement system 203 as multiple integrated circuits coupled by one or more buses. Data processing system 201 includes a plurality of components in system 203 and components which are shown external to system 203 but which are coupled to system 203 as shown in FIG. 2. Such components include a dynamic random access memory (DRAM) 207, a flash memory 209, both of which are coupled to memory controllers 227, a dock port 221 which is coupled to an universal asynchronous receiver/transmitter (UART) controller 247, a wireless (e.g., RF) transceivers 219 which are coupled to wireless interface controllers 241, a power management unit 217 coupled to an IIC port 239, a camera 215 which is coupled to a camera interface controller 237, an audio digital-to-analog converter (DAC) 213 which is coupled to an IIS port 235, a multi-touch input panel 211 which is coupled to a multi-touch input panel controller 231, and a display device 205 which may be a liquid crystal display device, which is coupled to a display controller 229. These various components provide input and output capabilities for the data processing system as is known in the art. The dock port 221, or another port, may be similar to the dock port of system 100 described above. For example, the dock port 221, or another port, may be used to provide images to an external display which is separate from the display 205, and these images may be a sequence, at a sufficient frame rate, of video images to present a motion picture or movie on the external display; the dock port may also provide for the ability to recharge one or more batteries in the system 201 and may also provide a communications channel, such as a fully bidirectional I/O port, which allows the exchange of data between the system 201 and another system such as a host system. This exchange of data may include synchronizing of contact/address information or calendar information or emails or music or movies or other information (or a combination of such information or data) between the system 201 and the another system. It will be appreciated that a "port," such as dock port 221, may include sets of wires for different purposes (e.g. one set to recharge a battery and provide power and optionally another set to provide a TV video output and another set to provide a bidirectional I/O port) but that the sets share a common mechanical connection on the system 201 or share the same physical area on a housing of the system 201. In other embodiments, a separate port, dedicated to providing a TV video output may exist on a housing of a system similar to system 201.

In addition, system 203 includes components, such as a graphics processing unit (GPU) 225 and a microprocessor 223 which may be, in certain embodiments, an ARM microprocessor. In addition, system 201 may include a digital signal processor 245 and an interrupt controller 243. These various components are coupled together by one or more buses and bus bridges ("bus matrix") 233 which may be implemented in a variety of architectures, such as the bus architecture shown in FIG. 1 or alternative bus architectures. Power management unit 217 may dynamically manage a performance state of data processing system 201, as described in further detail below. Power management unit 217, in conjunction with microprocessor 223, may implement other power management techniques, such as operating at different voltage and frequency operating points as described in above-referenced U.S. patent application Ser. No. 11/620,703. In one embodiment, power management unit 217 is configured to control bus matrix 233 to operate at as low frequency as possible without affecting the performance of the other components of the system, as described in further detail below. In one embodiment, power management unit 217 includes a dynamic performance state manager unit (not shown) that is described in further detail below.

In one embodiment, system 200 uses a single system clock (not shown) to drive components of the system, e.g., microprocessor 223, GPU 225, memory controllers 227, memories 207 and 209, bus matrix 233, and other components of the system. Frequency of the system clock and/or system voltage can determine how much power is used by system 200. In one embodiment, for system 200 to operate properly, bus matrix 233 is always turned "ON". In one embodiment, power management unit 217 controls the components of the system, such that each of the components of the system 200 could operate at as low performance level as possible for the current system performance state, as described in further detail below. As a result, the power of the system 200 is saved without sacrificing the performance level of the other components in the system 200.

While power management unit 217 is shown external to system 203, it may be part of a system on a chip implementation in certain embodiments. At least some of the other components, such as wireless transceivers 219, may also be implemented in certain embodiments as part of a system on a chip. Wireless transceivers 219 may include infrared transceivers as well as radio frequency (RF) transceivers and may include one or more of such transceivers, such as a wireless cellular telephone transceiver, a WiFi compliant transceiver, a WiMax compliant transceiver, a Bluetooth compliant transceiver, and other types of wireless transceivers. In one particular embodiment, wireless transceivers 219 may include a wireless cellular telephone transceiver, a WiFi compliant transceiver (IEEE 802.11 A/G transceiver), and a Bluetooth transceiver. Each of these wireless transceivers may be coupled to a respective wireless interface controller which may be one or more of a plurality of interface controllers, such as a UART controller or an IIS controller or an SDIO controller, etc. Data processing system 201 may include further input/output devices, such as a keypad, or a keyboard, or a cursor control device, or additional output devices, etc.

It will be understood that the data processing system of FIG. 2 may be implemented in a variety of different form factors or enclosures which package and embody the data processing system. For example, the data processing system 201 may be implemented as a desktop computer, a laptop computer, or an embedded system, consumer product or a handheld computer or other handheld device. It may be implemented to operate off of AC power or a combination of AC power and battery power or merely battery power in at least certain modes. The data processing system may include a cellular telephone and may have the form factor of a cellular telephone, such as a candy-bar style cellular telephone or a flip phone or a phone with a sliding keyboard which slides out (e.g., from an enclosure) or swings out (e.g., from an enclosure) to expose the keys of the keyboard.

In certain embodiments, data processing system 201 may be implemented in a tablet format of a small handheld computer, such as the iPhone from Apple Inc. of Cupertino, Calif., which includes wireless cellular telephony and WiFi and Bluetooth wireless capability.

Figure 3:
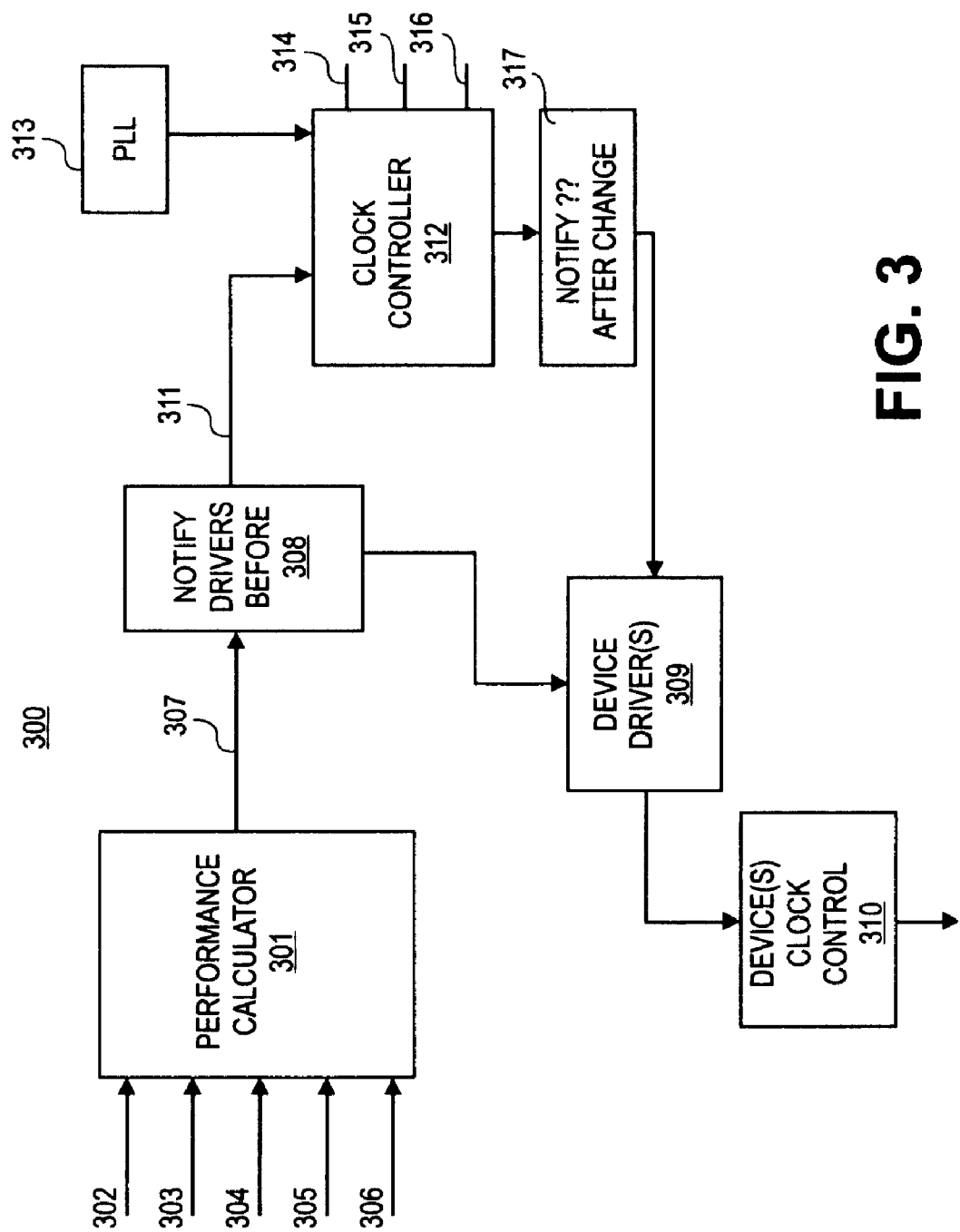
FIG. 3 shows a block-diagram of one embodiment of a dynamic performance state manager to dynamically manage a performance state of a data processing system.

FIG. 3 shows a block-diagram of one embodiment of a dynamic performance state manager (DPSM) 300 to dynamically manage a performance state of a data processing system, e.g., data processing systems 100 and 200, as depicted in FIGS. 1 and 2. The DPSM 300 is configured to save power of the data processing system while ensuring that the components of the system operate at the best performance level for a current task. In one embodiment, DPSM 300 may complement the power gating as described in above-mentioned co-pending U.S. patent application Ser. No. 11/620,703. In one embodiment, a state manager, such as the DPSM 300, is configured to allow a mode in which video images are provided as an output from a data processing system, such as systems 100 or 200, and the mode may include operating at least one component in the system beyond a specified normal operating range (e.g. the upper frequency limit of a component is exceeded by a certain amount). For example, this mode may be the first mode shown in FIGS. 9 and 10, and the video images may be a sequence of data representing video images transmitted through an output port (e.g. dock port 221) at a sufficient rate such that they can be presented as a movie at a frame rate of at least 10 to 15 frames per second and preferably at a higher frame rate. The state manager in this case configures the components at sufficient operating parameters (e.g. in frequency and operating voltages) to permit this output. Further description of this mode is provided in connection with FIGS. 9, 10 and 11A-11C.

DPSM 300 may use, in one embodiment, current local information from each component of the system to make a global decision for all components that are controlled by the system clock rate. As shown in FIG. 3, DPSM 300 includes a performance calculator 301 that is configured to receive information about a plurality of current states of components of the system. As shown in FIG. 3, performance calculator 301 has inputs, e.g., inputs 302-306, to receive information about current states of the components of the system. In one embodiment, the information about the current states of the components includes information about current activity of the components (e.g., devices) of the system. This information may be supplied by device drivers (e.g. software) for each component. In one embodiment, the current states of components are "ON" or "OFF" states of the components (or some other measure of activity such as a value between "ON" or "OFF", such as 50% utilization of capacity, etc.). In one embodiment, DPSM unit 300 is configured to receive a current "ON"/"OFF" state of all important devices in the system, for example, CPU, GPU, audio codec, display, video codec, and other devices of the system.

As shown in FIG. 3, inputs of performance calculator 301 receive notifications from components of the system about a current state of the component. In one embodiment, bits "1" or "0" may indicate "ON" or "OFF" state of the component. Input 302 may receive a signal (e.g., bit "0") that indicates that a CPU is currently turned "OFF", input 303 may receive a signal (e.g., bit "1") that indicates that a GPU is currently turned "ON", input 304 may receive a signal (e.g., bit "0") that indicates that an audio codec, e.g., an adaptive modulation and coding (AMC) audio codec device, is currently turned "OFF"; input 305 may receive a signal from a display controller that indicates that a display, e.g., a color liquid crystal display (CLCD), is currently turned "ON", and input 306 may receive a signal that indicates that an H264 video decoder is currently turned "OFF", and so on.

In another embodiment, the current states of components are values indicating, for example, a frequency, a power, a voltage, and any combination thereof that represent the current state of a component.

Figure 6:
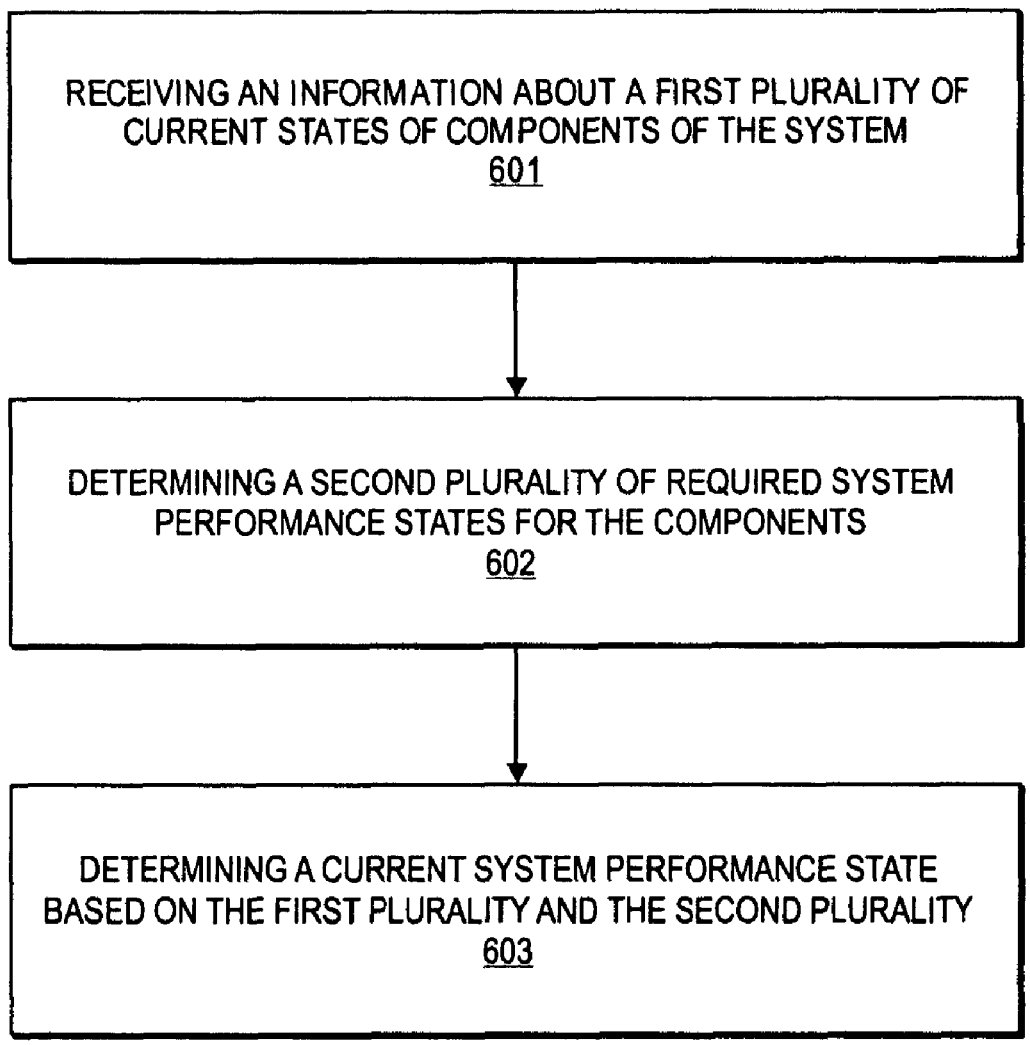
FIG. 6 shows a flowchart of one embodiment of a method to dynamically manage a performance state of a data processing system.

FIG. 6 shows a flowchart of one embodiment of a method to dynamically manage a performance state of a data processing system. As shown in FIG. 6, method 600 begins with operation 601 that involves receiving information about a first plurality of current states of components of the system, as described above with respect to FIG. 3. Method 600 continues with determining a second plurality of required system performance states for the components to operate correctly at operation 602, as shown in FIG. 6. In one embodiment, a required system performance state for a component of the system to operate correctly is a minimum system performance level (state) that is needed for a component to operate most power efficiently. As such, each of the components of the system is provided with the performance state that is not less than the performance state, which the component actually needs to perform its task(s).

Referring back to FIG. 3, DPSM 300 uses a set of the performance states that the data processing system supports, a list of device performance constraints, and a list of current states of operating devices to determine the most power efficient performance level for the system. In one embodiment, DPSM 300 includes a list of clocks required for each component of the system to operate correctly, and determines the minimum system performance level using this list of clocks. In one embodiment, DPSM 300 determines required system performance states for all components of the system that are controlled by a system clock. In one embodiment, DPSM 300 determines the required system performance states for each of the components using performance constraints of the components and a set of performance states that the system supports. In one embodiment, performance calculator 301 includes a function that calculates what minimum system performance level is required for each device of the system to function correctly, for example, most power efficiently. For certain components of the system to function correctly in at least certain embodiments, the minimum system's performance level is required to be substantially fast. For example, when a component of the data processing system, e.g., a microprocessor, memory controller, GPU, graphics controller, video controller, or other component is operating, it needs to operate at a highest system performance level, e.g., as fast as possible to accomplish its task in a shortest possible time, to avoid power "leakage".

For example, memory controllers 227 may be required to operate at a full frequency of a system clock because lowering the frequency of their operation may affect performance of the data processing system. Some components of the data processing system, for example, one or more buses of bus matrix 233, may be required to be always turned "ON" when system 200 is operating. Performance of other components of the system may be more determined by functionality rather than power. For example, a display controller, such as display controller 229, is required to be always turned "ON" when a display, such as display 205, is turned "ON". In one embodiment, the required system performance level for display controller 229 is about 50% that does not sacrifice the performance of the display controller 229.

In one embodiment, an audio codec device operates at a full frequency even when the system performance level is down to about 25%. Typically, at 25 MHz the audio codec device (referred to as "AMC") is faster then real time, but not quite at full speed. The driver for AMC registers for the performance state change notifications. As the system gets slower, it decreases its clock divider to increase its effective clock frequency. If there are multiple performance states that are fast enough, the performance state that is most power efficient for the set of operating devices may be used. In one embodiment, DSPM 300 uses a matrix of clock frequencies for components of the data processing system to set performance states of different components of the system, as described in further detail below. In one embodiment, DSMP 300 can take into account an activity of an application (e.g., synchronizing data on the device with data on another system) and dynamically decide which minimum system performance level to operate. In one embodiment, DPSM 300 obtains a current system performance state based on a current status of the components and most performance needy component, and then adjusts the performance state for substantially every component in the system based on the current system performance state.

FIG. 4 shows one embodiment of a data structure (e.g., a table) that is dynamically generated by performance calculator 301. As shown in FIG. 4, table 400 includes a list of components 1-5, e.g., a CPU, a GPU (Graphics Processing Unit), an H264 video decoder, an LCD, an AMC audio codec, and other devices of the system. As shown in FIG. 4, column 402 contains a required system performance level (state) for each of the components of column 401. In one embodiment, column 402 contains a required minimum system performance level (state) for each of the components of column 401. In one embodiment, the required system performance state is a relative value, e.g., a percentage, of a performance level of the component being controlled. In one embodiment, a required system performance state is determined relative to a maximum system performance state (level). In one embodiment, all the devices of the system have their performance requirements expressed as a percentage of the system's maximum performance.

As shown in FIG. 4, the required system performance state for components 1-3 (e.g., a CPU, GPU, and H264 video) to operate correctly is 100% relative to the maximum system performance level.

As shown in FIG. 4, the required system performance state for component 4 (e.g., an LCD) to operate correctly is 50% relative to the maximum system performance level. As shown in FIG. 4, the required system performance state for component 5 (e.g., an audio codec referred to as "AMC" to operate correctly is 25% relative to the maximum system performance state. In another embodiment, the required system performance state for a component is determined relative to a total bandwidth of the system. For example, the required system performance state for a component can be a percentage of a bandwidth relative to the total bandwidth of the system. In another embodiment, the required system performance state can be an amount of megabytes per second, such as a data processing bandwidth or a data transmitting and/or receiving bandwidth that is required for a component.

Column 403 includes a current state (e.g., ON/OFF state) for each of the components 1-5, as shown in FIG. 4. The current states for each of the components 1-5 can be received through inputs 302-306 shown in FIG. 3. As shown in FIG. 4, components 2 and 4 are "ON" and components 1, 3, and 5 are "OFF".

Referring back to FIG. 6, method 600 continues with operation 603 that involves determining a current system performance level (state) based on the plurality of the current states of the components of the system and the plurality of the required system performance levels (states) for the components. That is, what the performance level of the data processing system should be is determined based on the plurality of the current states of the components and the plurality of required system performance levels (states) for the components.

Referring back to FIG. 4, column 404 contains actual performances for each of the components obtained based on the current states of the components and the required system performance states for the components. In one embodiment, actual performances are calculated by multiplying data of column 402 with data of column 403 for each of components 1-5. As shown in FIG. 4, for component 1, if the current state is "OFF" and required system performance state is 100%, the actual performance is 0%. For component 2, if the current state is "ON" and the required system performance state is 100%, the actual performance is 100%. For component 3, if the current state is "OFF" and the required system performance state is 100%, the actual performance is 0%. For component 4, if the current state is "ON" and the required system performance state is 50%, the actual performance is 50%. For component 3, if the current state is "OFF" and the required system performance state is 25%, the actual performance is 0%. In one embodiment, the current system performance state is calculated using actual performances data from column 404. In one embodiment, the current system performance state is determined by calculating a maximum value of actual performances 404 for each of components. That is, the current system performance state is determined based on the requirement for the most performance-needy component and the current states of the components. For the example shown in FIG. 4, the current system performance state determined based on actual performances in column 404 is 100%.

Referring back to FIG. 3, performance calculator 301 outputs a current system performance state 307 that is determined based on active states of the components. That is, in certain embodiments, rather than using theoretical assumptions (such as "guessing"), the active states of the components of the system are used to determine a current level of performance for the system while maintaining a minimum performance level to satisfy components' requirements.

Referring back to FIG. 4, when the components 1-4, such as CPU, GPU, LCD, and H264, are turned "OFF", and component 5, such as AMC, is turned "ON", the current system performance state (level) dynamically goes down to 25%. That is, the current system performance level is maintained at a minimum performance level to satisfy performance requirements of the component 5, such as AMC. When any of the components 1, 2, and 3, or any combination thereof, is turned "ON", the current system performance level dynamically increases up to about 100%, to satisfy performance requirements for any of these components. The system may be considered to be dynamic in adjusting the level because it responds to changes in the state of the components. When components 4 and 5 are turned "ON", and components 1-3 are turned "OFF", the current system performance level dynamically decreases down to about 50%, to satisfy the performance requirement of the most performance needy component, e.g., component 5. In one embodiment, the current system performance state is dynamically changed by changing a system clock rate. In another embodiment, the current system performance state is dynamically changed by changing the width of the system bus, such as one or more buses depicted in FIGS. 1 and 2. For example, the width of the system bus may be changed from 16 bits to 32 bits when the current system performance state dynamically increases from about 50% to about 100%.

As shown in FIG. 3, current system performance state 307 is provided to a clock controller 312 that controls a clock of the data processing system, such as systems 100 and 200 depicted in FIGS. 1 and 2 respectively. In one embodiment, DPSM 300 operates transparently to device drivers, so that the device drivers are not aware of the DPSM. In another embodiment, as shown in FIG. 3, performance calculator 301 notifies (block 308) one or more drivers 309 to drive one or more components (e.g., I/O devices) through their respective drivers when the current system performance state 307 changes. I/O devices, such as an audio codec, may operate at a certain fraction of the bus clock. For example, when the current system performance level is about 100%, the audio codec may be driven to operate at the system clock (e.g., bus clock) divided by four. When current system performance level changes, e.g., from 100% to 25%, an audio codec driver is notified to change its divider to divide the system clock by one to maintain the audio codec's clock near its fixed frequency target.

As shown in FIG. 3, one or more drivers 309 are notified (block 308) in one embodiment before adjusting the performance level of the at least one component of the system based on the current performance state 307. In one embodiment, current system performance state 307 is a performance level the data processing system needs to change to. In one embodiment, driver 309 is notified even if the component that is driven by driver 309 is turned "OFF".

In one embodiment, one or more drivers 309 are coupled (through for example software messages between an operating system component and the drivers) to control clock of one or more components (e.g., I/O devices) (not shown). As shown in FIG. 3, performance calculator 301 provides the current system performance state 307 to the system clock controller 312 to adjust a performance level of at least one component, such as a CPU, GPU, memory, bus, and the like. The performance level of the component is adjusted to according to the current system performance state.

In one embodiment, the performance level of the component is adjusted by modifying the frequency of the clock (clock rate). As shown in FIG. 3, clock controller has adjusted clock outputs, such as outputs 314, 135, and 316 that output adjusted clocks to the components, e.g., a CPU, GPU, memory, and bus, and the like. The adjusted clock outputs provide clocks that are adjusted based on the current system performance state 307. For example, output 314 may provide the adjusted clock to the CPU. Output 315 may provide an adjusted refresh rate for the memory of the data processing system. Typically, the refresh rate of the memory is derived from the memory controller's frequency. In one embodiment, one or more dividers (not shown) are used to divide the memory controller's frequency to provide the adjusted refresh rate. While the memory refresh rate may be handled in the code as a special case, it works in the about the same fashion as AMC. In one embodiment, when the current system performance level changes, the divider to provide the refresh rate is changed to maintain the correct memory performance level to ensure that the memory refresh rate does not go too fast and effect performance or too slow and effect stability. In one embodiment, when the current system performance level increases, (e.g., from 25% to 100%) the divider that provides the refresh rate is changed from 1/4 to 1/1 to maintain the efficient memory performance level. As shown in FIG. 3, output 316 may provide a clock that is adjusted based on the current system performance state 307, to one or more buses of the data processing system. In another embodiment, the performance level of the component is adjusted by modifying a bandwidth. In an embodiment, the bandwidth of the bus coupled to the component may be increased or decreased based on the current system performance state.

That is, any component of the data processing system that drives its functional clock from the system clock is effectively configured itself to operate correctly when the current system performance state changes.

As shown in FIG. 3, one or more device drivers 309 are notified, in one embodiment, in block 317 after adjusting clocks 314-316 to drive components of the system. In one embodiment, I/O devices adjust their performance state when they receive notification 317, after one or more clock outputs 314-316 is changed. In one embodiment, notifications 308 and/or 317 allow I/O devices to maintain effectively at a fixed frequency operation, or at least near or under a fixed frequency target, or other constraint.

Figure 5:
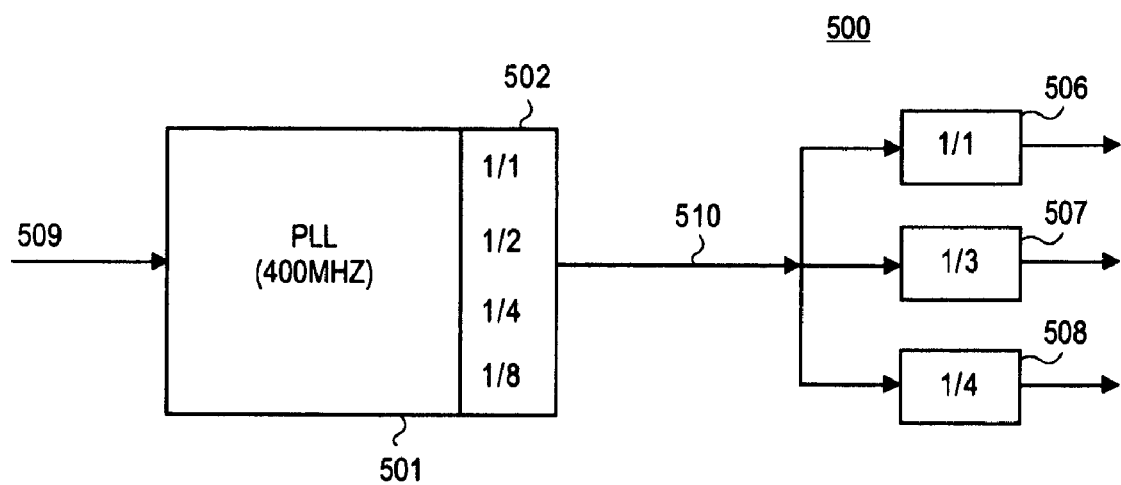
FIG. 5 shows a block-diagram of one embodiment of a clock controller to dynamically control clock of the components of a data processing system.

FIG. 5 shows a block-diagram of one embodiment of a clock controller 500 to dynamically control clock of the components of a data processing system; e.g., data processing systems 100 and 200, as depicted in FIGS. 1 and 2. As shown in FIG. 5, clock controller includes a programmable phase-locked loop ("PLL") device 501 that is coupled to a plurality of clock outputs, such as outputs 506, 507, and 508, for the components. PLL device 501 includes an output 502 that has dividers, such as dividers /1, /2, /4, /8, to output a current system performance clock 510 that is determined based on a current system performance state 509. As shown in FIG. 5, PLL device 501 generates a system clock, e.g., 400 MHz and outputs the system clock through one of the dividers that can be selected based on current system performance state 509. For example, when current system performance state 509 changes from about 100% to about 50%, PLL device 501 changes the divider of output 502 from 1/1 to ½, such that the system clock can be dynamically changed from 400 MHz to 200 MHz. In one embodiment, when all components of the system are in "OFF" state, the current system performance state is 12.5%, and PLL device 501 outputs the system clock through an $1/8^{th}$ divider. The current system performance clock 510 is provided to a plurality of component clocks outputs, such as outputs 506-508. Outputs 506-508 provide clocks that are adjusted based on the current system performance state to drive the components of the system; e.g., a CPU, GPU, memory, one or more buses, and the like. In one embodiment, outputs 506-508 include clock dividers, such as dividers 1/1, 1/3, 1/4, and the like to drive the components of the system. In one embodiment, when the current system performance is determined to be about 100% (e.g., 400 MHz), the clock to the CPU provided through 1/1 divider is about 400 megaherz (MHz), the clock to the memory provided through 1/3 divider is about 133 MHz, and the clock to the bus is provided through 1/4 divider is about 100 MHz. In one embodiment, when the current system performance changes from 100% to 50%, the clocks output through dividers 506-508 to the CPU, memory, and bus become 200 MHz, 66 MHz, and 50 MHz respectively. In one embodiment, when the current system performance state increases (e.g., from 50% to 100%), the system clock is divided down by a larger number (e.g., by 4 rather than by 2) to maintain a fixed frequency operation to keep a fixed memory refresh rate. In one embodiment, when the current system performance state increases; e.g., from 50% to 100%, the performance of the components of the system can be leveraged to take advantage of the increased performance. That is, the clocks of the components can be adjusted to take an advantage of the increased system performance state to accomplish their individual tasks quicker.

Figure 7:
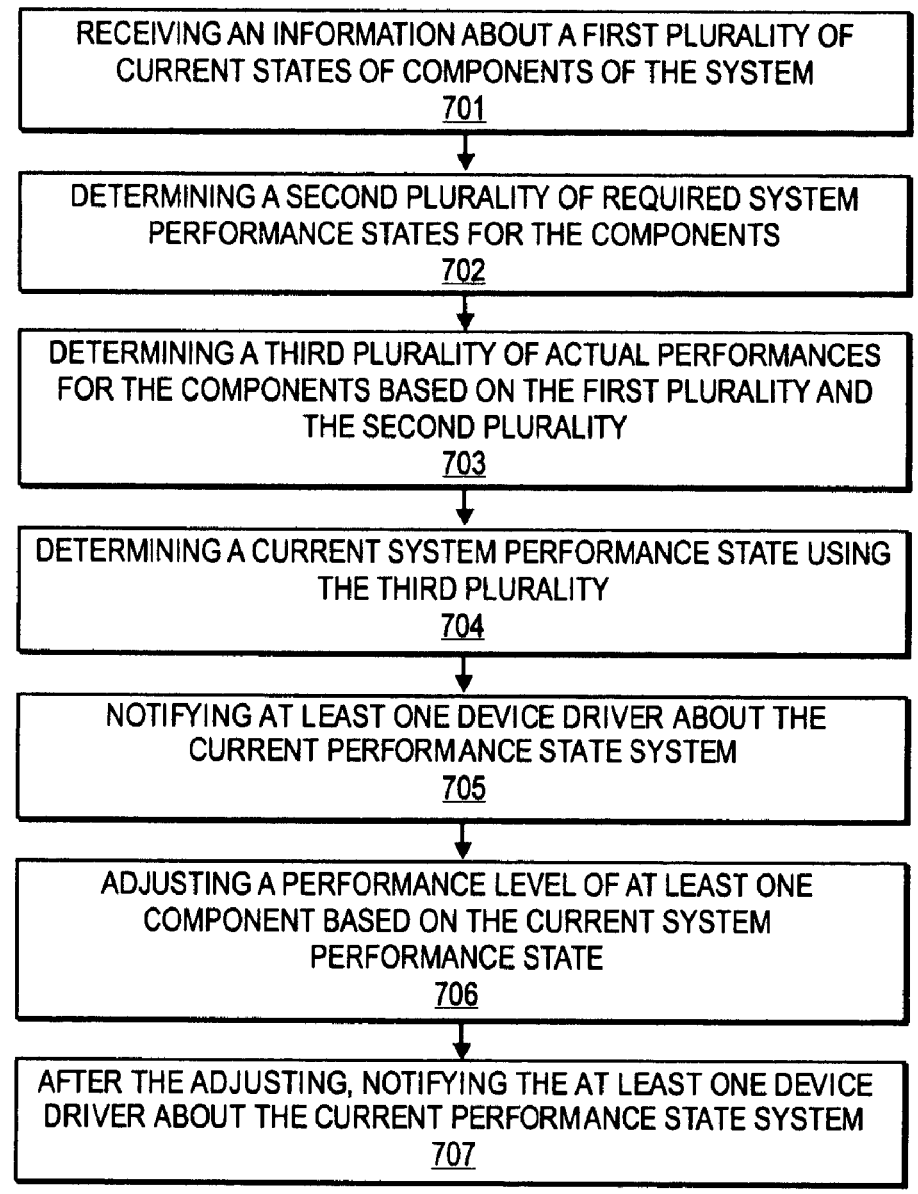
FIG. 7 shows a flowchart of another embodiment of a method to dynamically manage a performance state of a data processing system.

FIG. 7 shows a flowchart of another embodiment of a method to dynamically manage a performance state of a data processing system. Method 700 starts at operation 701 that involves receiving information about a first plurality of current states of components of the data processing system, as described above. Method 700 continues at operation 702 that involves determining a second plurality of required system performance states for the components of the system, as described above. At operation 703, determining a third plurality of actual performances for the components based on the first plurality of current states of the components and the second plurality of the required system performance states is performed as described above. At operation 704 a current system performance state is determined using the third plurality of the actual performances of the components, as described above. Method continues with operation 705 that involves notifying at least one device driver about the current performance state, to adjust the device (e.g., I/O device) if needed. At operation 706 adjusting a performance level of at least one component (e.g., a processor, memory, bus) based on the current system performance state is performed. Next, operation 707 is performed that involves notifying the at least one device driver about the current system performance state after adjusting, as described above.

Figure 8:
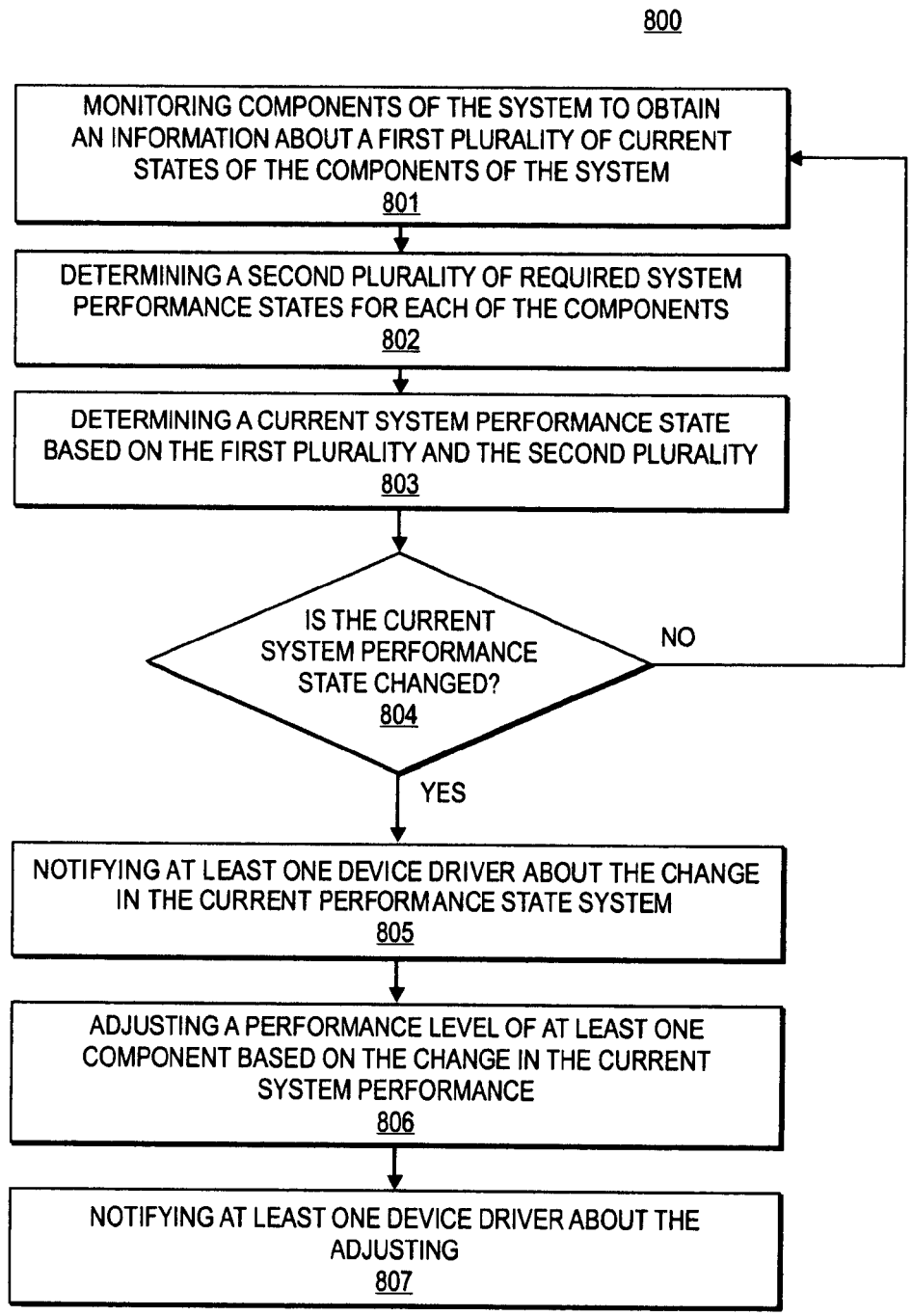
FIG. 8 shows a flowchart of another embodiment of a method to dynamically manage a performance state of a data processing system.

FIG. 8 shows a flowchart of another embodiment of a method to dynamically manage a performance state of a data processing system. Method 800 starts at operation 801 that involves monitoring components of the system to obtain information about a first plurality of current states of the components of the system. In one embodiment, DPSM 300 monitors components of the system by receiving notifications from the components when the current status of the component changes, as described above with respect to FIG. 3.

Method 800 continues with operation 802 that involves determining a second plurality of required system performance states for each of the components of the system, as described above. Next, at operation 803, a current system performance state is determined based on the first plurality of current states of the components and the second plurality of required system performance states. At operation 804 a determination is made if the current system performance state changed. If the current system performance stated has not been changed, method returns to operation 801. If the current system performance state has been changed, operation 805 is performed that involves notifying at least one device driver about the change in the current performance state, to adjust the device (e.g., I/O device) if needed. Next, at operation 806, adjusting a performance level of at least one component (e.g., a processor, memory, bus) is performed based on the change in the current system performance. At operation 807 notifying of at least one device driver about the adjusting the performance level of the at least one component is performed, as described above.

At least certain embodiments described herein include the use of a state manager, such as a dynamic performance state manager, to operate a data processing system in a mode in which images are output from a port or in a mode in which at least one of the components in the system is operated in a manner beyond a specified normal operating parameter. In certain embodiments, the system may be operated in a mode in which the images are provided through an output from the system and the system is also operated, in the case of at least one component of the system, beyond a specified normal operating parameter. When a component is operated beyond a specified normal operating parameter, the mode may be referred to as a "turbo" mode. The output may be still pictures or a sequence of video images presented at a sufficiently high frame rate (e.g. at least 10 or 15 frames per second) to appear on an external display as a motion picture or movie. The output may be from a multi-purpose dock port or from a port dedicated to providing an output of images, such as still pictures or a movie. This embodiment of such a state manager may be implemented on a handheld data processing system which includes a cellular telephone transceiver and an integrated display device and an integrated input device. The port may be a dock port or other port which allows for charging of a battery within the data processing system and which also allows for a bidirectional input/output of data to synchronize the data between the data processing system and another system, such as one or more of contact/address data, calendar data, email data, bookmarks, music data, movie data, and notes data. The transition from one mode to an image output mode may involve changing the voltage and/or frequency of several components under the control of a state manager, such as a dynamic performance state manager unit, wherein at least some of the components are operating at different frequencies or voltages or both prior to the transition and after the transition as well, in at least certain embodiments. The transition changes one or more of voltage or frequency or bus width, etc. for at least one of the components when transitioning to the image output mode.

The outputting of images, such as movies, etc. may be controlled by a digital rights management (DRM) system in at least certain embodiments to prevent unauthorized use or copying of the content. For example, in at least certain embodiments, the images may be transmitted through an input/output port or other port to allow playback on an external display in response to determining that a system controlling the external display is configured to not copy, in a permanent storage, the content of the video images. For example, the system providing the output of the images through a port may receive a confirmation from a host system that the software or other component receiving the images is configured to not copy the images or other content received through the port. In other embodiments, the data representing video images or other content are transmitted through a port to allow playback on an external device or display in response to determining that the system controlling the external display or device is authorized, under a DRM system, to retain a copy of the data representing the video images or other content.

Figure 9:
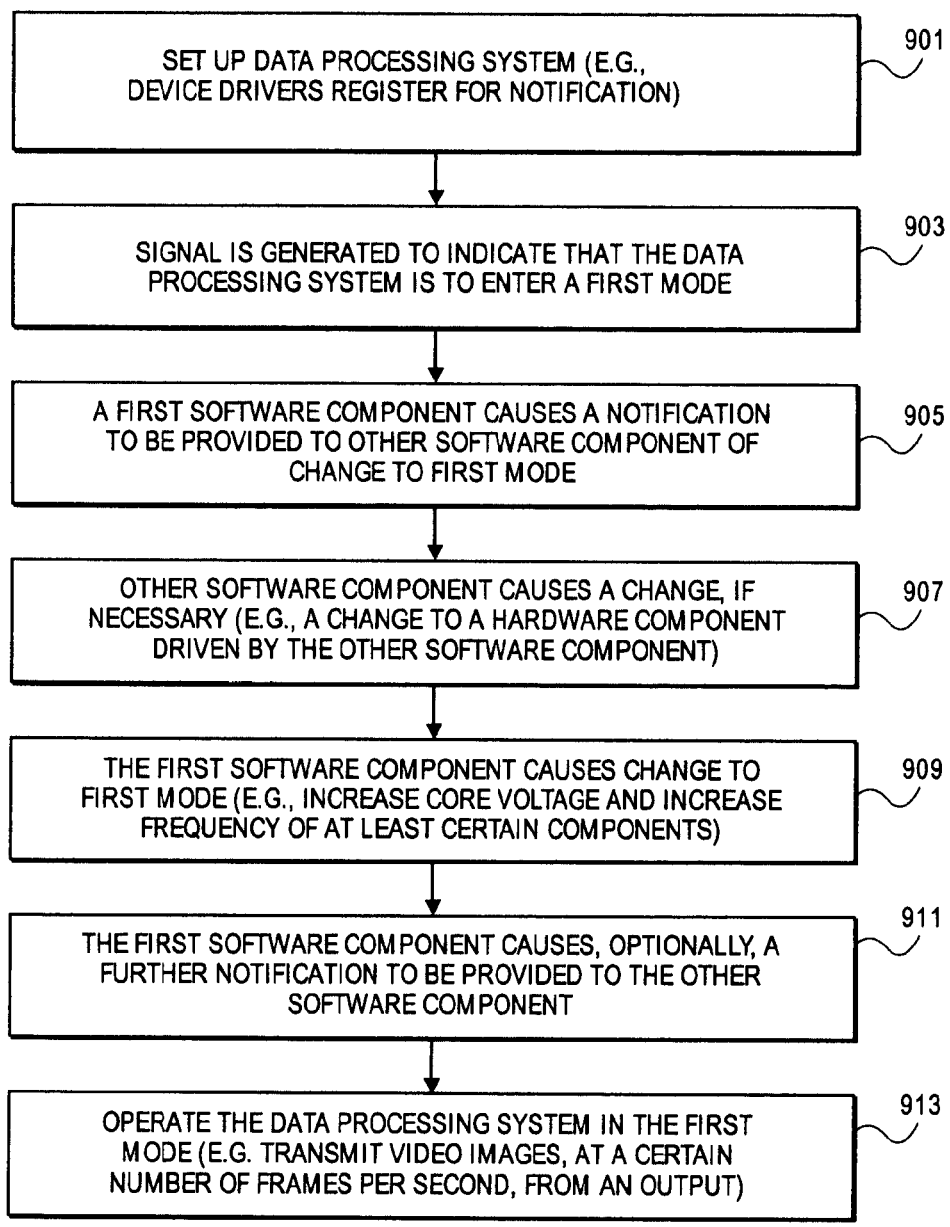
FIG. 9 shows a flowchart of another embodiment of a method of operating a data processing system.

FIG. 9 shows a flowchart which depicts an embodiment of a method for transitioning to a mode in which images are outputted and/or at least one of the components in the system is operated beyond a normal specified operating parameter. The method may begin in operation 901 in which the data processing system is set up to perform the transition. This may include storing information specifying operating parameters, such as voltage and frequency for various components in the different modes, and may further include registering for notification by one or more device drivers which control various components in the system. For example, device drivers for various components which need to perform changes in response to a transition register for notification. This may be performed by each device driver registering with a kernel or other operating system component in such a manner that when the transition is initiated, the kernel will cause a notification to be transmitted, typically in a serial fashion, to each of the device drivers which have registered for notification. These notifications can then be used as described further below to cause changes in the operating parameters for each component driven by the particular device driver which receives the notification. In at least certain embodiments, the device drivers may receive a notification directly from another device driver which is responsible for controlling the mode in which images are outputted from the data processing system. It will be appreciated that the data processing system may be, for example, the system 100 or the system 201 shown in FIGS. 1 and 2, respectively. It will also be appreciated that the data processing system may include a dynamic performance state manager, such as the state manager shown in FIG. 3.

Figure 11A:
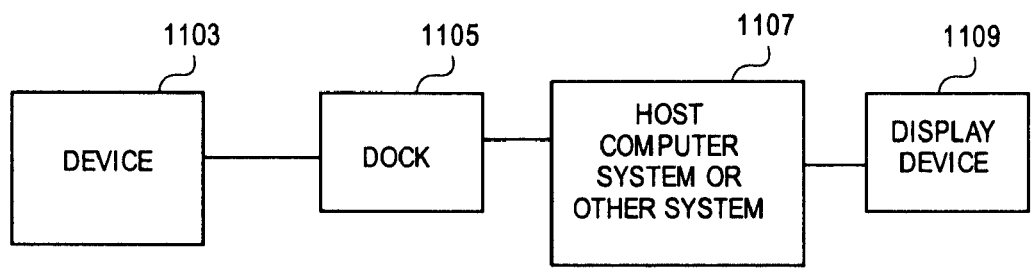
FIGS. 11A, 11B, and 11C show examples of embodiments which provide a video image output from a data processing system, such as a handheld data processing system.
Figure 11B:
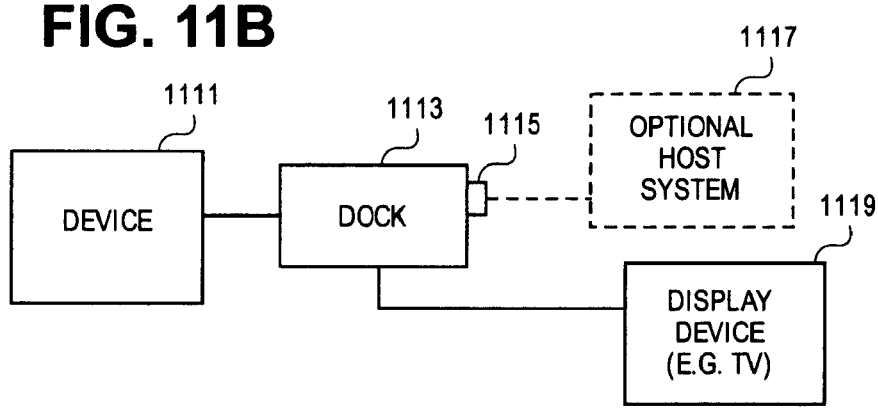
Figure 11C:
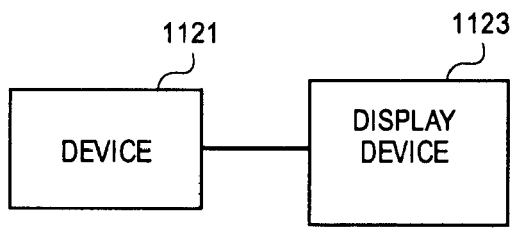

In operation 903, a signal is generated to indicate that the data processing system is to enter a first mode, which may include the ability to provide an output of images from the data processing system. This signal may be generated in response to a user's action or in other ways. For example, connecting the data processing system to a cable or to a dock may automatically cause the signal to be generated in certain embodiments or the signal may be generated in response to the activation of a movie player software by the user which receives a request from the user to play a movie while the data processing system is connected through a port to an external display, either directly or through another system, etc. FIGS. 11A, 11B, and 11C show three different embodiments in which a data processing system, such as devices 1103, 1111, and 1121 may be connected directly or indirectly to a display device. In response to the signal being generated, a first software component, in operation 905, may cause a notification to be provided to at least one other software component, which notification specifies the change to a first mode or otherwise indicates the change to a first mode. The first software component may provide the notification in series in such a manner to allow each software component to perform any required changes. The order in which the notifications are provided to the other software components may be predetermined based upon the particular design of the data processing system. For example, the changing of certain clock rates on certain components may be performed before changing the clock rates on other components in order to allow the data processing system to perform properly. In other embodiments, the notifications may be provided in parallel to the other software components, such as other device drivers.

In operation 907, the other software component or components cause one or more changes to be implemented, if necessary, in order to accommodate the transition to the first mode. For example, each device driver receiving the notification may cause a change to occur to the hardware component controlled by or driven by the device driver. These changes may include a change in the clock rate or bus width or voltage of a component as described previously herein, and these changes may be made through an embodiment such as the embodiment shown in FIG. 3. This may include the changing of dividers for clock circuits, etc. In operation 909, the first software component, after providing the necessary notifications, causes a change to the first mode. In one embodiment, this may involve increasing a core voltage of a system on a chip, such as the system on a chip 203 shown in FIG. 2. Further, the change may also include the increase of a frequency of at least certain components in order to allow for a sufficiently high frame rate of video data to be output through a port of the data processing system. In operation 911, the first software component may also cause, in at least certain embodiments, a further notification to be provided to the other software component or components that the change to the first mode has been completed. It will be appreciated that this operation may be optional in certain embodiments. Further, it will be appreciated that in at least certain embodiments the notification operation 905 may be omitted, but the notification operation 911 is performed after the change to the first mode. After the change to the first mode, the data processing system operates, in operation 913, in the first mode. This may include transmitting video images, at a certain number of frames per second, from an output port of the data processing system.

FIG. 10 shows another example of a method of operating a data processing system, and in this case it shows an example of a method which exits from the first mode described in conjunction with FIG. 9. In operation 1001, a signal indicates that the first mode is to be exited. This may occur by the user removing the device from the dock or disconnecting a cable from a port or closing or quitting a movie player software, etc. In operation 1003, a first software component, such as a device driver for a component involved in outputting video images, causes a notification to be provided to other software component or components, such as one or more device drivers for components that are involved in the first mode. This notification indicates that the data processing system is about to exit the first mode. In operation 1005, the other software components, in response to the notification, cause changes, if necessary, to their respective hardware components. Then in operation 1007, the first software component causes an exit from the first mode to another mode, such as a lower frequency operating mode, for at least certain of the components in the data processing system. This may be performed by the first software component calling a dynamic performance state manager to set states based upon the current usage of components as described above. In operation 1009, the dynamic performance state manager may then cause a notification to the other software components of the new state or states. It will be appreciated that, in alternative embodiments, operations may be omitted or added in the methods shown in FIGS. 9 and 10 or they may be performed in an order which is different than shown in those figures.

FIGS. 11A, 11B, and 11C show three examples of how a data processing system, which outputs images through a port, may be coupled to a display device. In the case of the embodiment shown in FIG. 11A, the data processing system or device 1103 is coupled through a dock 1105 to a host computer or system or other system 1107 which in turn is coupled to a display device 1109, such as a liquid crystal display device or a CRT display device. The display device 1109 is controlled by the host computer system 1107 and receives the images through the host system 1107. The host system may be executing software which is designed to authenticate, through a DRM system, that the content received from the device 1103 is authorized to be displayed (and/or replicated by the system 1107) onto the display device 1109. In alternative embodiments, the device may be able to cause the playback of a movie or of still images on a display device 1109 without any requirement of authentication or the use of a DRM system. In the embodiment shown in FIG. 11B, a device 1111 is coupled through a dock 1113 to a display device 1119. The display device 1119 may be a computer monitor which includes an NTSC input port or a PAL input port or a similar type of port which can receive video images for display on a display device. In this case, the images are displayed directly onto the TV without going through an optional host system 1117. In the case of the embodiment shown in FIG. 11B, the dock 1113 includes a first port 1115 for coupling to an optional host system 1117, and a second port for coupling to a display device, such as a TV or other display device or monitor for displaying images. The embodiment shown in FIG. 11C includes a device or data processing system 1121 which provides a direct connection to a display device 1123. In this case, the display device 1123 may be considered to be controlled directly by the device 1121 as it outputs images to the display device 1123. It will be understood that the host computer system, such as the system 1107 or the optional host system 1117, may be a system which is designed to be synchronized with the device which is coupled to it. For example, the device 1103 may include data to be synchronized with the host computer system 1107 and vice versa. This data may include music data, movie data, calendar information or data, contact/address data, email data, etc. It will also be understood that the dock, such as the docks 1105 or 1113, may include the ability to provide power to the respective device, such as device 1103 or the device 1111 while it is coupled to the dock. This power may be used to not only power the device, but also to recharge any battery within the device.

In the foregoing specification, embodiments of the invention have been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense.

What is claimed is:

1. A handheld data processing system comprising:
a processing system;
a cellular telephone transceiver coupled to the processing system;
a port coupled to the processing system, the port and the processing system being configured to provide, in a first mode, as an output from the handheld data processing system, data representing movie video images,
wherein different components in the handheld data processing system are operated at different operating frequencies in the first mode as specified by a first set of frequencies and the different components are operated at different operating frequencies in a second mode as specified by a second set of frequencies.

2. The handheld data processing system as in claim 1 further comprising a battery coupled to the processing system and wherein the port is coupled to the battery and is configured to allow recharging of the battery when the handheld data processing system is coupled to a power source.

3. The handheld data processing system as in claim 1 further comprising:
a display integrated into a housing of the handheld data processing system and coupled to the processing system;
an input device coupled to the processing system; and
wherein the movie video images are provided in a sequence of at least 15 frames per second to an external display.

4. The handheld data processing system as in claim 3, wherein the handheld data processing system occupies a volume of less than 6 inches by 4 inches by 1 inch.

5. The handheld data processing system as in claim 3, wherein the data representing movie video images are transmitted through the port to allow playback on the external display in response to determining that a system controlling the external display is configured to not copy, in a permanent storage, the content of the movie video images.

6. The handheld data processing system as in claim 3, wherein the data representing the movie video images are transmitted through the port to allow playback on the external display if a system controlling the external display is authorized, under a digital rights management system, to retain a copy of the data representing movie video images.

7. The handheld data processing system as in claim 3 further comprising:
a storage device configured to store the data representing movie video images and wherein the storage device is also configured with software to store and view music, calendar information, contact information, and text messages.

8. The handheld data processing system as in claim 1, wherein a first device driver, for a first component of the different components, causes a notification to be provided to a second device driver in response to a transition between the first and second modes.

9. The handheld data processing system as in claim 8, wherein the port is configured to provide a communications channel for synchronizing data between the handheld data processing system and a host system.

10. The handheld data processing system as in claim 1, wherein the first mode is configured to operate at least one different component beyond a specified normal operating parameter and the second mode is configured to operate the different components within normal operating parameters.

* * * * *